United States Patent
Shoham et al.

(10) Patent No.: US 7,212,535 B2
(45) Date of Patent: **\*May 1, 2007**

(54) SCHEDULING ITEMS USING MINI-QUANTUM VALUES

(75) Inventors: Doron Shoham, Shoham (IL); Amir Michaeli, Hertzelya (IL); David J. Tsiang, Menlo Park, CA (US); Chandrashekhar Appanna, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/395,191

(22) Filed: Mar. 31, 2006

(65) Prior Publication Data

US 2006/0176883 A1    Aug. 10, 2006

Related U.S. Application Data

(63) Continuation of application No. 10/104,759, filed on Mar. 21, 2002, now Pat. No. 7,065,091.

(51) Int. Cl.
*H04L 12/28* (2006.01)
(52) U.S. Cl. .............. 370/395.41; 370/395.4; 370/465; 370/468; 370/412; 709/240; 709/341; 709/226; 709/235
(58) Field of Classification Search ............ None
See application file for complete search history.

(56) References Cited

U.S. PATENT DOCUMENTS

| 6,247,061 | B1 * | 6/2001 | Douceur et al. ............ 709/240 |
| 2003/0103514 | A1 * | 6/2003 | Nam et al. .................. 370/412 |
| 2003/0169743 | A1 * | 9/2003 | Chiussi et al. ........... 370/395.4 |

OTHER PUBLICATIONS

Giroux N et al., "Queuing and Scheduling, Scheduling Mechanisms", Quality of Service in ATM Networks: State-of-the-Art Traffic Management, 1999, pp. 96-109.
M. Shreedhar and George Varghese, "Efficient Fair Queuing Using Deficit Round-Robin," IEEE/ACM Transactions on Networking, IEEE Inc., New York, USA, vol. 4, No. 3, Jun. 1996, pp. 375-385.

(Continued)

*Primary Examiner*—Chi Pham
*Assistant Examiner*—Raj K. Jain
(74) *Attorney, Agent, or Firm*—The Law Office of Kirk D. Williams

(57) ABSTRACT

Disclosed are, inter alia, methods, apparatus, data structures, computer-readable media, and mechanisms, for scheduling items in a system, such as, but not limited to a computer or communications system. For example, in one implementation, each of the items in a set of items has an associated deficit and mini-deficit. A next particular item is selected from the set of items currently having enough deficit to process the particular item. One or more entities associated with the particular item is processed a commensurate amount corresponding to the mini-deficit associated with the particular item. This processing is repeatedly performed until there are no more entities associated with the particular item or until the deficit associated with the particular item does not allow any further processing at the current time.

24 Claims, 7 Drawing Sheets

OTHER PUBLICATIONS

C. Partridge, "A Proposed Flow Specification," RFC 1363, Sep. 1992, 20 pages.

Craig Partridge, Gigabit Networking, Addison Wesley Longman, Inc. 1994, pp. 253-263.

M. Shreedhar and George Varghese, "Efficient Fair Queuing Using Deficit Round-Robin," Proc. SIGCOMM' '95 Cambridge, MA, ACM, 1995, pp. 231-242.

M. Shreedhar and George Varghese, "Efficient Fair Queuing Using Deficit Round-Robin," IEEE/ACM Transactions on Networking, vol. 4, No. 3, Jun. 1996, pp. 375-385.

Sugih Jamin et al., "A Measurement-Based Admission Control Algorithm for Integrated Service Packet Networks," IEEE/ACM Transactions on Networking, vol. 5, No. 1, Feb. 1997, pp. 56-70.

Grenville Armitage, Quality of Service in IP Networks: Foundations for a Multi-Service Internet, Macmillian Technical Publishing, Apr. 2000, pp. 35-104.

George Coulouris et al., Distributed Systems: Concepts and Design, Third Edition, Addison-Wesley, 2001, pp. 607-633.

S. Keshav, An Engineering Approach to Computer Networking: ATM Networks, the Internet, and the Telephone Network, Addison Wesley Longman, Inc. 1997, Chapter 9, pp. 209-263.

* cited by examiner

SCHEDULING ITEMS USING MINI-QUANTUM VALUES

CROSS-REFERENCE TO RELATED APPLICATIONS

This is a continuation of nonprovisional Application No. 10/104,759, filed Mar. 21, 2002 now U.S. Pat. No. 7,065,091, which is hereby incorporated by reference in its entirety.

TECHNICAL FIELD

This invention especially relates to scheduling of information and/or processes, such as those used in communications and computer systems; and more particularly, the invention relates to scheduling entities and items using quantum and deficit values, including, but not limited to the scheduling of the sending of packets in a packet switching system.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet. For example, a enqueuing component of such a device receives a stream of various sized packets which are accumulated in an input buffer. Each packet is analyzed, and an appropriate amount of memory space is allocated to store the packet. The packet is stored in memory, while certain attributes (e.g., destination information and other information typically derived from a packet header or other source) are maintained in separate memory. Once the entire packet is written into memory, the packet becomes eligible for processing, and an indicator of the packet is typically placed in an appropriate destination queue for being serviced according to some scheduling methodology.

When there is a contention for resources, such as on output links of a packet switching system or interface or even for compute cycles in a computing device, it is important for resources to be allocated or scheduled according to some fairness policy. Moreover, the amount of work required to schedule and to enqueue and dequeue a packet or other scheduled item is important, especially as the operating rate of systems increase.

Ordinary round-robin (RR) is an algorithm commonly used for sharing a common resource between several clients. All clients are served in a cyclic order. In each round every client will be served if it is eligible. When served, each client is permitted to send one packet. Servicing of queues is simple to implement and can be done in constant time, but, due to the varying size of packets, does not allocate bandwidth fairly.

In some scenarios, high priority (e.g., low latency), guaranteed bandwidth, best effort traffic (e.g., spare bandwidth) and other classifications of traffic compete for a common resource. Various known scheduling algorithms are designed to provide isolation, prioritization, and fair bandwidth allocation to traffic competing for a common resource. These are known as fair queuing algorithms. Some examples are Weighted Fair Queuing (WFQ), Self-Clocked Fair Queuing (SCFQ), and Deficit Round Robin/Surplus Round Robin (referred to as DRR).

WFQ, and SCFQ depend upon arrival times as well as previous link utilization in order to calculate the next best packet to send. The accepted "ideal" behavior is bit-by-bit round robin, which states that the next packet to send should be the packet which would have completed if all packets currently in the system send one bit each round robin (which is typically not practical in a packet based system). The inclusion of arrival times in the scheduling algorithm, in order to calculate theoretical ideal departure times, typically requires insertion into a sorted list which is known to be an O(log N) problem worst case where N is the number of packets already enqueued.

DRR is an algorithm used for sharing a common resource between several clients with different ratios between clients (i.e., some clients are allowed to consume more of the resources than others). The ratio between clients is typically defined by a parameter called a quantum.

DRR services queues using round-robin servicing with a quantum assigned to each queue. Unlike traditional round-robin, multiple packets up to the specified quantum can be sent resulting in each queue sending at least a quantum's worth of bytes. If the quantum for each queue is equal, then each queue will send an equal amount of bandwidth.

This DRR approach works in rounds, where a round is one round-robin iteration over the queues that have items to be sent. Typically, when the queue is scheduled, it is allowed to transmit until its deficit becomes negative, and then the next queue is served. Packets coming in on different flows are stored in different queues. Each round, each queue is allocated a quantum worth of bits, which are added to the deficit of each queue. Each queue is allowed to send out one or more packets in a DRR round, subject to the restriction that it cannot send more bits than indicated by the deficit corresponding to the queue. If there are no more packets in a queue after the queue has been serviced, the deficit corresponding to the queue is set to zero. Otherwise, the remaining amount (i.e., the deficit minus the number of bits sent) is maintained for the next round.

DRR is an algorithm that does not depend upon actual arrival times and has complexity of O(1)—that is the amount of work required is a constant and independent of the number of packets enqueued. In order to be work conserving, a packet should be sent every time a queue is scheduled. Thus, the quantum used in DRR should be at least one maximum packet size (MTU) to guarantee that when the quantum is added to any deficit, the resulting value is at least zero. DRR provides fair bandwidth allocation and is easy to implement. It is work conserving and, because of its O(1) properties, it scales well with higher link speeds and larger number of queues. However, its scheduling behavior deviates quite a bit from the bit-by-bit round robin "ideal". In particular, latency for a system with N queues is Q*N where Q is the average quantum, which must be at least one maximum transport unit (MTU).

In one implementation, called modified deficit round robin (MDRR), there is optionally one high priority (HP) client mapped to each resource, in addition to the other non-high priority (NHP) clients mapped to the resource. In this implementation there are two possible modes of operation: low latency mode and fair mode. In low latency mode, the HP client is constantly served until it is not eligible (i.e., either it has an empty queue or it had exceeded its allocated bandwidth). The NHP clients are only served whenever the HP client can't be served. Low latency mode reduces the latency of the HP client (good for voice/video applications), but can cause starvation of NHP clients. In fair mode, one packet is sent from the HP client and one from other NHP clients in alternating order as long as the HP client didn't reach its maximum allocated bandwidth. Fair mode is a one compromise point between the requirement not to starve NHP clients and the low latency requirement of HP clients.

Needed are new methods and apparatus for scheduling of packets in a packet switching system, especially those which may provide good latency performance while maintaining O(1) work properties, and/or have other desirable characteristics.

SUMMARY

Disclosed are, inter alia, methods, apparatus, data structures, computer-readable media, and mechanisms, for scheduling items in a system, such as, but not limited to a computer or communications system. In one embodiment, each of the items in a set of items has an associated deficit and mini-deficit. A next particular item is selected from the set of items currently having enough deficit to process the particular item. One or more entities associated with the particular item is processed a commensurate amount corresponding to the mini-deficit associated with the particular item. This processing is repeatedly performed until there are no more entities associated with the particular item or until the deficit associated with the particular item does not allow any further processing at the current time.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
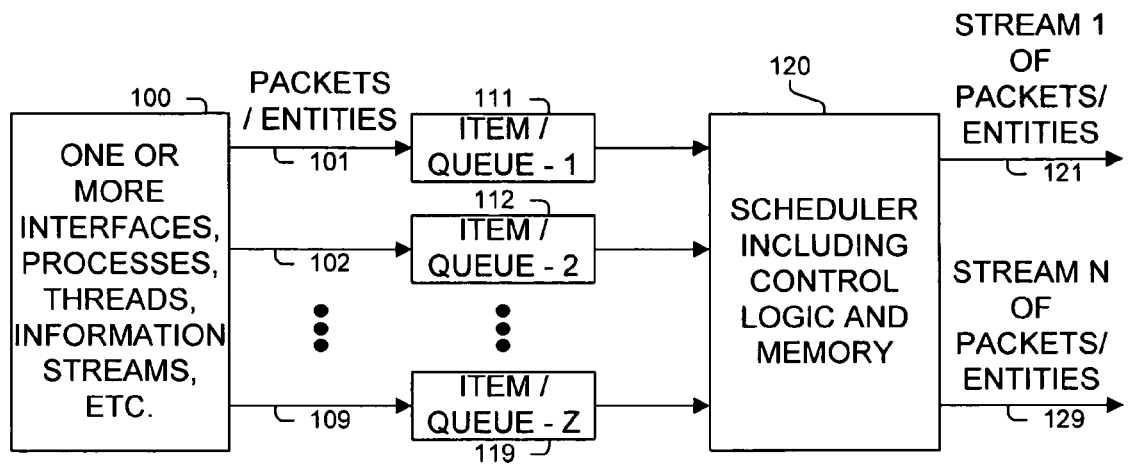
FIG. 1 is a block diagram of one embodiment for scheduling entities and items using quantum and deficit values.

Methods and apparatus are disclosed for scheduling entities and items using quantum and deficit values, especially in communications and computer systems. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to the block and flow diagrams, are typically performed in a different serial or parallel ordering and/or by different components and/or over different connections in various embodiments in keeping within the scope and spirit of the invention.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc.

The term "storage mechanism" includes any type of memory, storage device or other mechanism for maintaining instructions or data in any format. "Computer-readable medium" is an extensible term including any memory, storage device, and/or other storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed a processor and/or control logic, and data which is manipulated a processor and/or control logic. The term "data structure" is an extensible term referring to any data element, variable, data structure, data base, and/or one or more or an organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism.

The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Moreover, the phrase "based on x" is used to indicate a minimum set of items x from which something is derived, wherein "x" is extensible and does not necessarily describe a complete list of items on which the operation is based. Additionally, the phrase "coupled to" is used to indicate some level of direct or indirect connection between two elements or devices, with the coupling device or devices modify or not modifying the coupled signal or communicated information. The term "subset" is used to indicate a group of all, less than all, or none of the elements of a set. Moreover, the term "or" is used herein to identify an alternative selection of one or more, including all, of the conjunctive items.

Methods and apparatus are disclosed for scheduling items (e.g., packets, processes, etc.) in a system, such as, but not limited to a computer or communications system (e.g., router, switch, etc.) In one implementation, multiple sets of items requiring processing to be performed are maintained. A current set of the multiple sets of items is identified. Each of the items in the current set is processed. In one implementation, this processing includes identifying a particular item in the current set, adding a quantum to a deficit of the particular item, processing an entity corresponding to the particular item, decreasing the deficit of the particular item by a value, determining if the deficit allows the particular item to be further processed, and moving the particular item from the current set to another of the multiple sets of items after said determining if deficit allows the particular item to be further processed.

In one embodiment, multiple sets of items requiring processing to be performed are maintained, wherein these sets of items are processed in some deterministic sequence. A current set is selected and processed until empty. An item is selected from the current set and a quantum is added to the deficit of the particular item. While the deficit of the item is not negative (or non-positive), the entities from item are processed (e.g., some corresponding action performed, a packet is sent from a queue, a process is allowed to be processed by some number of CPU cycles, etc.), and the item's deficit is decreased by some corresponding value. After the deficit of the item becomes negative, the item is moved from the current list to another of the multiple lists, typically based on the item's current deficit, quantum, current set, and deterministic sequence such that when the next time the item is referenced, its quantum will be great enough to at least perform one action (e.g., send one packet).

In one embodiment, the size of the quantum is approximately the maximum packet size divided by the number of sets of items. If an item becomes empty, it is not further processed nor placed in another active set until it has entities requiring processing, and then it is placed in the appropriate set.

In one embodiment, multiple sets of items requiring processing to be performed are maintained, wherein these sets of items are processed in some deterministic sequence. A current set is selected and processed until empty. The current set is sequenced through, and during the first such sequencing through, the quantum is added to the deficit of each item. During this sequencing, one entity of an item is allowed to be processed (e.g., some corresponding action performed, a packet is sent from a queue, a process is allowed to be processed by some number of CPU cycles, etc.) In one embodiment, this processing corresponds to one entity (e.g., a packet, number of CPU cycles, etc.) In one embodiment, a mini-quantum worth of processing is performed on the item, which may allow multiple entities to be processed. The item's deficit is decreased by some corresponding value, and a next item is processed. However, if the item becomes empty, it is removed from the set, or if the item's deficit becomes negative (or non-positive), the item is placed in another set. In one embodiment, two sets are used: a currently active set and a currently inactive set, and thus the item would be placed in the currently inactive set. When the currently active set becomes empty, it becomes the currently inactive set, and the other set becomes the currently active set and processing repeats. In one embodiment, more than two sets are used, and in which case, the item is moved from the current list to another of the multiple lists, typically based on the item's current deficit, quantum, current set, and deterministic sequence such that when the next time the item is referenced, its quantum will be great enough to at least perform one action (e.g., send one packet). In one embodiment, allowing a mini-quantum's worth of processing of a unit at a time increases packet interleaving and may reduce jitter especially when the processing required by individual entities varies, such as when the lengths of packets greatly vary.

In one embodiment, every item has a deficit value. Every scheduling time a packet is sent from the client, the packet length is subtracted from the deficit. The client is allowed to transmit only a single packet in every scheduling round, and the client is allowed to participate in the next scheduling round if its deficit is still not negative. Once the deficit become negative, the client is not allowed to participate in the scheduling round. In one embodiment, this done by taking out the client from the active list (e.g., the list currently being serviced) and putting it into an inactive list (e.g., a list not currently being serviced, but for containing clients to be scheduled). Once all the clients demands have been served as identified by the active list being empty, a next list become the active list, and the active list becomes an inactive list. In one embodiment, only two lists are used, while in one embodiment, more than two lists are used. In one embodiment, the quantum used is at least one MTU to ensure a packet is sent each time a client is processed.

In one embodiment, a source is serviced (e.g., a packet is sent) when its turn comes and as long as its deficit and mini-deficit and leaky bucket are not negative. A source gets a new mini-quantum given to it every round (when its turn comes) and quantum when it is passed from the active list to the inactive list. An active list is the list of sources that didn't complete their bandwidth share (i.e., their deficit is not negative). The inactive list is the list of sources that have completed their bandwidth share (i.e. their deficit became negative). As sources from the active list transmit packets the active list becomes shorter and shorter until it becomes empty. When that active list becomes empty the active list and the inactive list are switched.

In one embodiment, two linked lists are maintained: an active linked list consisting of clients with a positive deficit value (i.e., the clients are eligible to send packets in this DRR round); and an inactive linked list consisting of clients with a non-positive deficit value (i.e., the clients are not eligible to send packets in this DRR round). A programmable mini-quantum parameter per client is used along with the mini-deficit to determine the number of bytes that will be sent by each client in each round. In one embodiment, there is only one mini-deficit variable used, while in one embodiment, a mini-deficit variable is used for each item, which allows, in one embodiment, to maintain the amount of negative mini-deficit for each item in and/or across rounds.

The active linked list is scanned, and each client is permitted to send mini-quantum bytes (or a little more because whole packets are sent). When the corresponding mini-deficit becomes non-positive (or negative depending on the embodiment), the next client on the active linked list is served. The appropriate number of bytes will be subtracted from mini-deficit after each packet sent from a client. Usually a client is not dequeued from the active linked list when mini-deficit becomes non-positive. Only when deficit becomes non-positive is a client dequeued from the active linked list, and then either is enqueued to the inactive clients list or back to the free linked list (when the client becomes not eligible for sending packets due to a maximum bandwidth allocation or when a client doesn't have packets to send). The active linked list becomes shorter and shorter as clients complete sending their quantum. When a client completes sending its quantum, assuming it has packets to send and is still eligible to send packets, it will be dequeued from the active linked list and enqueued to the inactive linked list. In one embodiment, a status bit that states that this client didn't get mini-quantum for this round will be set. This status bit may be a global bit for all clients on the same list or particular to a client. When the active linked list becomes empty, it becomes inactive and the previous inactive client linked list becomes active. In the first round, all clients get their mini-quantum. In one embodiment, two linked lists are used as clients that finished their quantum are discriminated from clients that didn't finish their quantum but finished their mini-quantum.

FIG. 1 illustrates one embodiment of a system such as, but not limited to a computer or communications system, which schedules entities and/or items according to the invention. Packets or other entities or indications thereof 101–109 to be scheduled are received from one or more interfaces, processes, threads, information streams, or other sources 100. These packets or other entities 101–109 are typically stored in items/queues 111–119 for scheduling by scheduler 120. In one embodiment, such as that processing packets or communication streams, scheduler 120 processes one or more streams of packets or other entities 101–109 to produce one or more streams of outputs 121–129. For example, in one embodiment, streams of packets 101–109 are stored in queues 111–119. Scheduler 120 schedules packets from queues 111–119 to produce one or more streams of packets 121–129.

Figure 2:
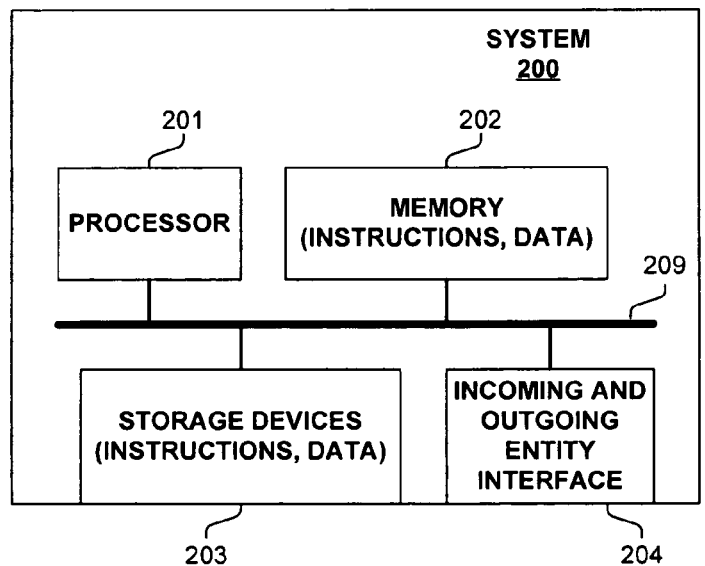
FIG. 2 is a block diagram of one embodiment for scheduling entities and items using quantum and deficit values.

FIG. 2 illustrates one embodiment of a system 200 such as, but not limited to a computer or communications system, scheduling entities and/or items according to the invention. In one embodiment, system 200 schedules internally generated entities, such as, but not limited to processes, threads, information streams, packets or other entities. In one embodiment, system 200 receives externally generated entities and/or internally generates entities, and schedules the processing and/or sending of these entities by system 200 or by another system. For example, in one embodiment, system 200 schedules internal processes, threads, etc. In one embodiment, system 200 receives streams of packets (or other information units), schedules packets belonging to these streams, and generates one or more external streams of scheduled packets.

In one embodiment, system 200 includes a processor 201, memory 202, storage devices 203, and optionally one or more incoming and/or outgoing entity interface 204, which are typically coupled via one or more communications mechanisms 209 (shown as a bus for illustrative purposes). Various embodiments of system 200 may include more or less elements. The operation of system 200 is typically controlled by processor 201 using memory 202 and storage devices 203 to perform one or more scheduling tasks or processes. Memory 202 is one type of computer-readable medium, and typically comprises random access memory (RAM), read only memory (ROM), flash memory, integrated circuits, and/or other memory components. Memory 202 typically stores computer-executable instructions to be executed by processor 201 and/or data which is manipulated by processor 201 for implementing functionality in accordance with the invention. Storage devices 203 are another type of computer-readable medium, and typically comprise solid state storage media, disk drives, diskettes, networked services, tape drives, and other storage devices. Storage devices 203 typically store computer-executable instructions to be executed by processor 201 and/or data which is manipulated by processor 201 for implementing functionality in accordance with the invention.

Figure 3A:
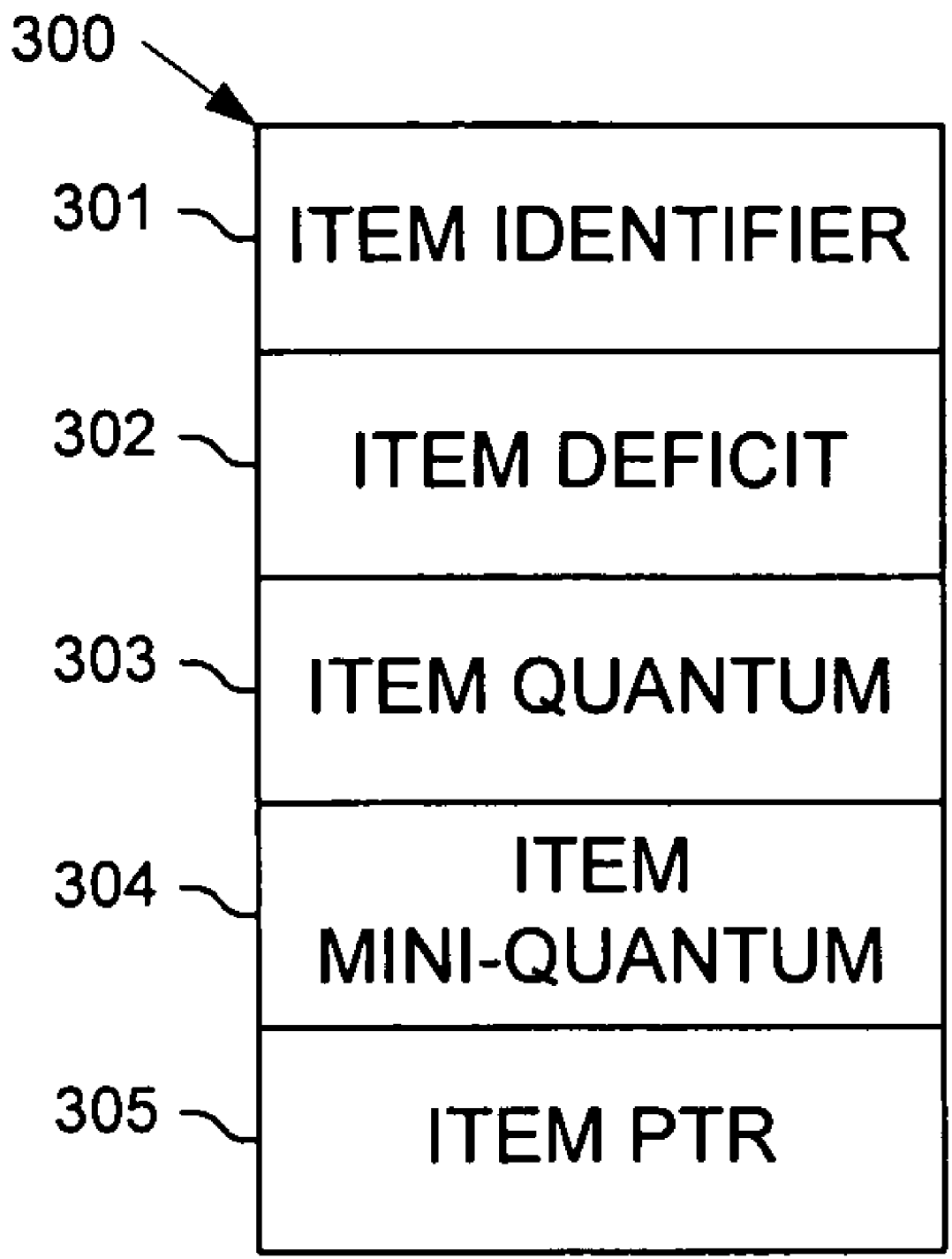
FIGS. 3A–D are block diagrams of data structures used in one embodiment.

FIGS. 3A–3D illustrate exemplary data structures used in one or more of an unlimited number of embodiments of the invention. FIG. 3A illustrates a data structure used by to identify an item and to maintain a deficit for the item. One embodiment uses all fields 301–305 of data structure 300. One embodiment uses less than all of fields 301–305 of data structure 300.

Figure 3B:
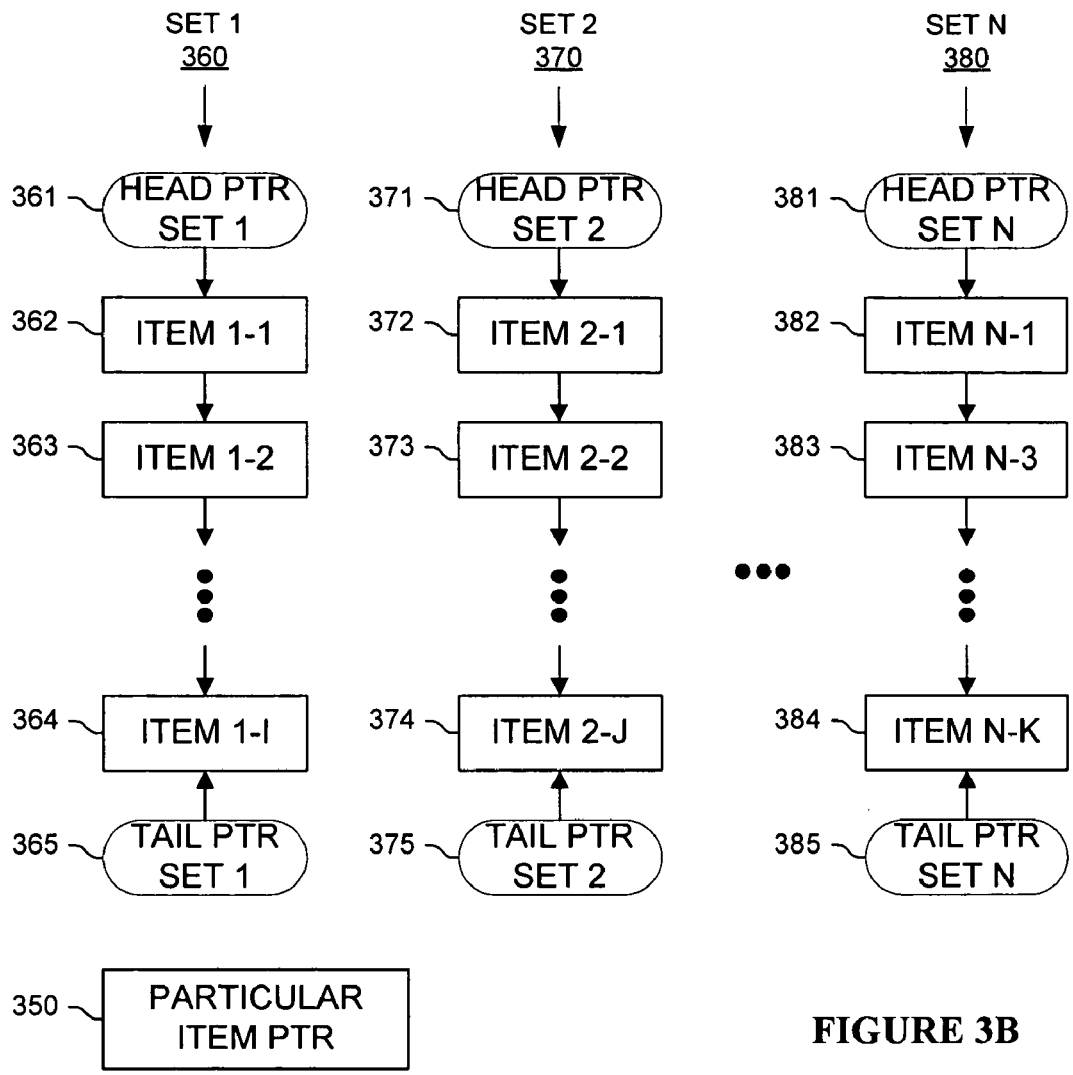

As shown, data structure 300 includes an item identifier field 301 used to indicate the particular item (e.g., a set of queues or other items), an item deficit field 302 used to maintain a deficit value for the item, an item quantum field 303 used to indicate a quantum for the item as quantum values in one embodiment may vary between items to provide varying amounts of bandwidth, processing time, etc. for the items (and if they are the same, then item quantum field 303 is typically not used or included), and an item pointer field 304 used in a linked list of items, such as that illustrated in FIG. 3B. In one embodiment, an additional field for storing a mini-quantum value is included in data structure 300, which may be especially useful if items use different mini-quantum values.

FIG. 3B illustrates multiple sets 360, 370 and 380 having respective items 362–364, 372–374, and 382–384 which require processing to be performed. In one embodiment, items 362–364, 372–374, and 382–384 correspond to queues containing packets or other entities to be processed. In one embodiment, items 362–364, 372–374, and 382–384 correspond to processes or threads requiring CPU time. As shown, each set 360, 370 and 380 is in the form of a linked list (and numerous other data structures are used in other embodiments.) A linked list is convenient for maintaining an ordered set (e.g., a list) of items. In the embodiment illustrated, each list or set 360, 370 and 380 has a head pointer 361, 371, and 381, and a tail pointer 365, 375, and 385. In one embodiment, a particular item pointer 350 is used to indicate one of the items 362–364, 372–374, and 382–384 currently being processed.

Figure 3C:
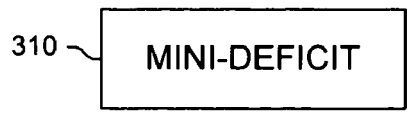

FIG. 3C further illustrates a mini-deficit data structure or counting mechanism 310 used in one embodiment to maintain a mini-deficit value for an item that is currently being processed, such as that described in the flow diagram of FIG. 7 further described hereinafter.

Figure 3D:
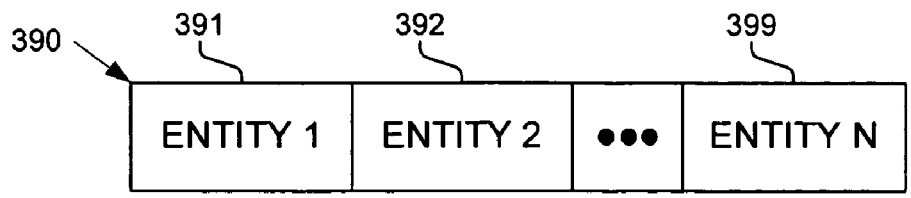

FIG. 3D illustrates a data structure comprising an item 390 used in one embodiment. As shown, item 390 comprises multiple entities 391–399. In one embodiment, item 390 corresponds to a queue, and entities 391–399 correspond to packets to be scheduled and sent. In one embodiment, an entity corresponds to a unit of work performed on an item.

Figure 4:
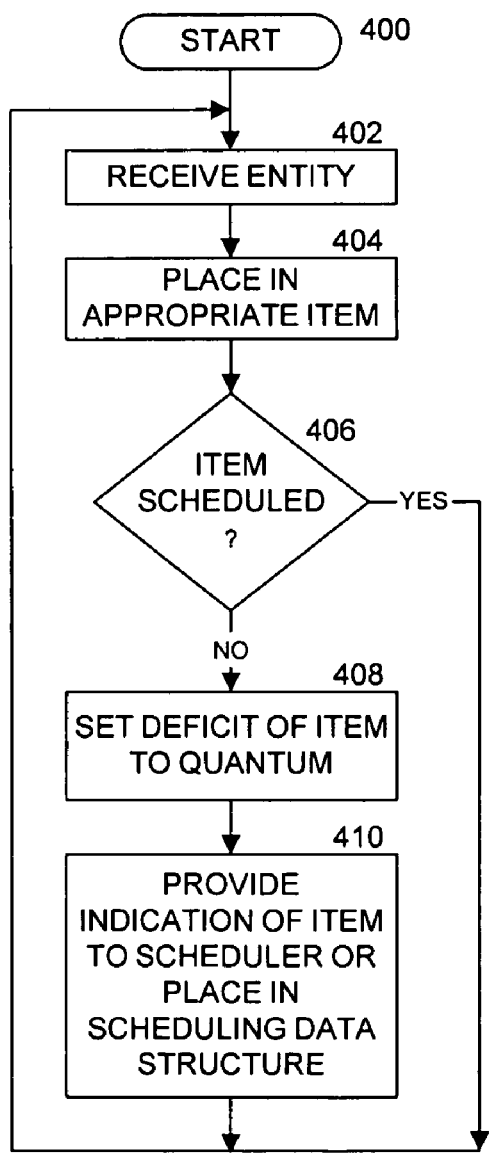
FIG. 4 is a block diagram of an enqueue process used in one embodiment to ensure a scheduler is aware of an item with an entity to be scheduled.

FIG. 4 illustrates a process used in one embodiment to ensure that an item requiring processing is scheduled. Processing begins with process block 400, and proceeds to process block 402, wherein an entity (or indication thereof) requiring processing is received, and the entity is placed in the appropriate item in process block 404. Next, as determined in process block 406, if the item is already in the scheduling system, then processing returns to process block 402. Otherwise, in process block 408, the deficit of the item is set to its quantum value, and in process block 410, an indication of the item is provided to the scheduler or possibly the item is added to one of the scheduling sets in the scheduling data structure. In one embodiment, the quantum is the same for all items. In one embodiment, the quantum is not the same for all items, as, for example, one item (e.g., queue) might be allocated more bandwidth for sending packets than another item. In one embodiment, the initialization of the deficit of an item is performed in another process (e.g., that depicted in FIG. 4, 5 or 6), but the initialization in process block 408 may save one or more memory accesses which may be important in some embodiments. Processing then returns to process block 402.

Figure 5:
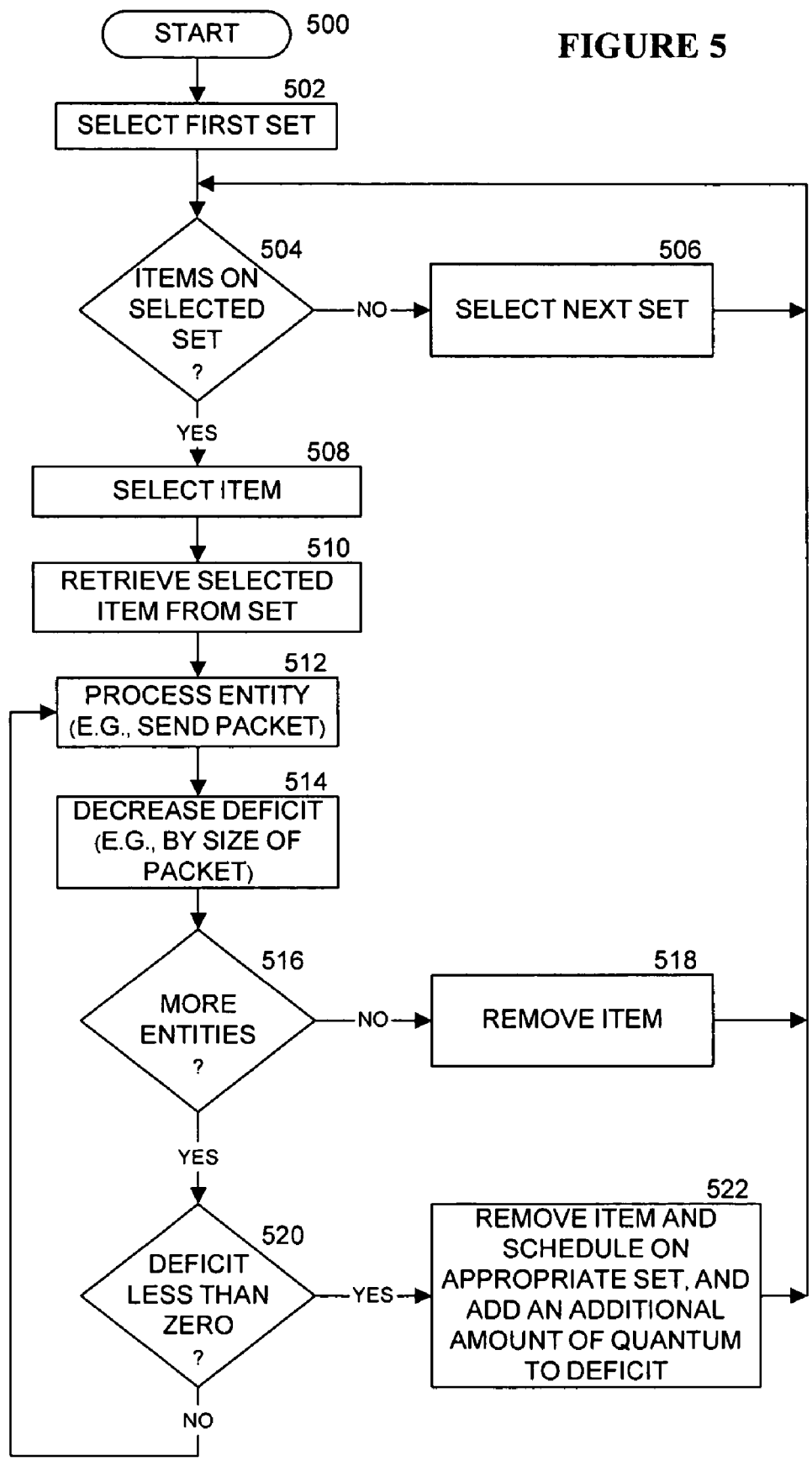
FIG. 5 is a flow diagram of a process used in one embodiment for scheduling the processing of entities and items within one or more sets of items.

FIG. 5 illustrates a scheduling process used in one embodiment. Processing begins with process block 500, and proceeds to process block 502, wherein a first set is selected. Next, as determined in process block 504, if there are no items in the selected set, then in process block 506, a next set is selected and processing returns to process block 504.

Otherwise, in process block 508, an item, such as the first one if an ordered set is used or another item, is selected from the set. In process block 510, the information corresponding to the item is retrieved. Next, in process block 512, an entity, typically the first entity, is processed. In one embodiment, a packet is sent. Next, in process block 514, the deficit of the item is decreased by some constant or variable value, such as the size of the sent packet or other value commiserate with the processing performed. Note, in one embodiment, the quantum used may be less than one maximum transport unit (MTU). In one embodiment, the quantum used is at least (1 MTU/(S−1)), where S is the number of sets and S>1.

Next, as determined in process block 516, if there are no more entities in the item, then in process block 518, the item is removed from the set as it has no more processing to be performed, and processing returns to process block 504. Otherwise, as determined in process block 520, if the deficit does not allow the item to be further processed (e.g., the deficit is less than a predetermined constant value such as zero or determined via another comparison), then, in process block 522, the item is placed in another of the sets of items typically based on the value of the deficit for the item, its quantum, and the current set, such that the item will not be manipulated further until it actually would have developed enough quantum to process one of its entities. Additionally, the deficit for the item is increased by an appropriate additional quantum corresponding to the next time the item is serviced or processed. In one embodiment, an item's deficit is increased by n quantum, where n corresponds to the position of the set (in which the item is placed) in relative order of servicing of sets, where the value of n is typically an integer greater than or equal to one. For example, if the item is placed in the next set to be serviced, it's deficit will be increased by one quantum, and if the item is placed in the second next set to be serviced, it's deficit will be increased by two quantum, and so forth. Processing then returns to process block 504. Otherwise, processing returns to process block 512 to process another entity.

Figure 6:
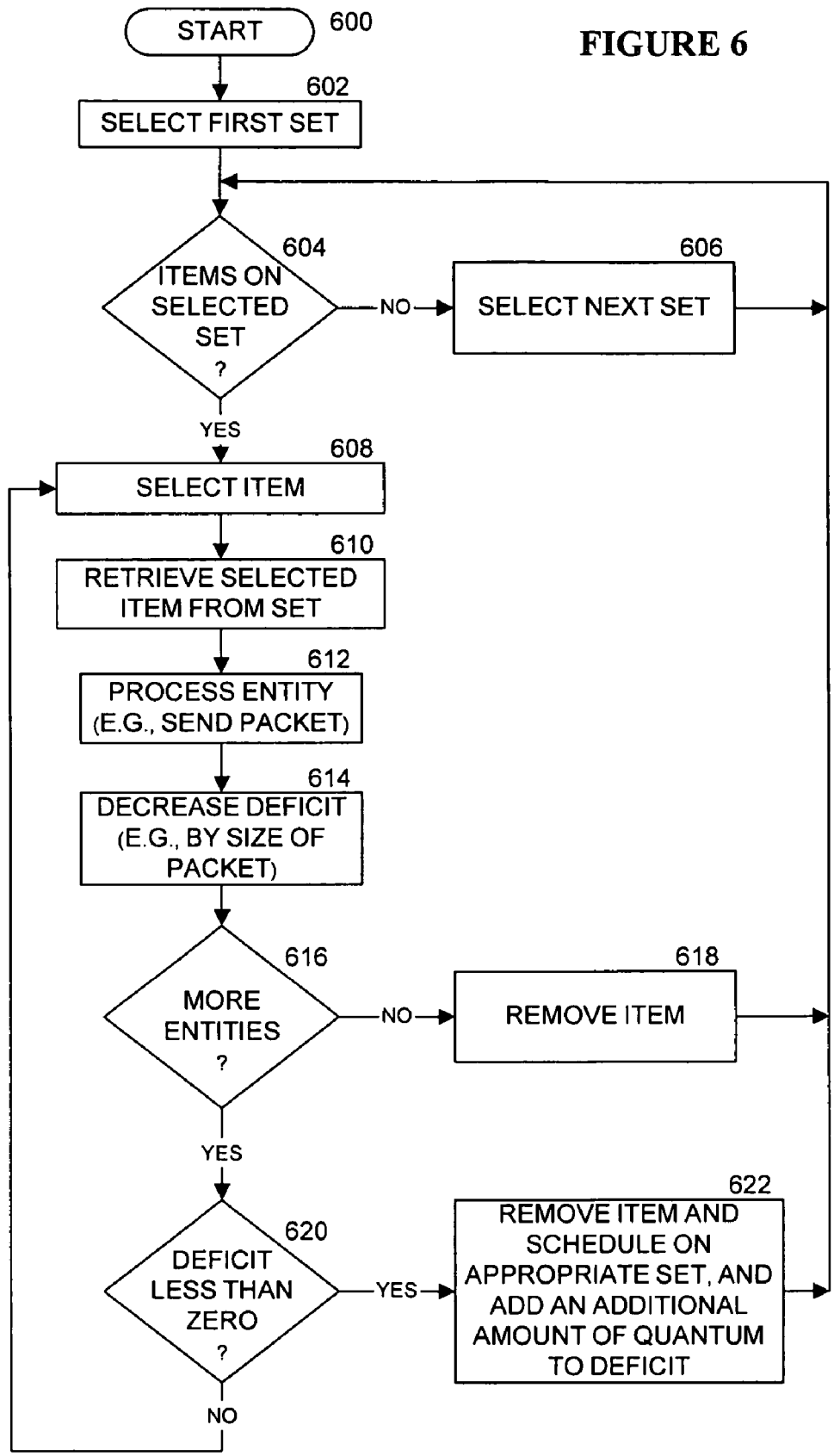
FIG. 6 is a flow diagram of a process used in one embodiment for scheduling the processing of entities and items within one or more sets of items.

FIG. 6 illustrates a scheduling process used in one embodiment. Processing begins with process block 600, and proceeds to process block 602, wherein a first set is selected. Next, as determined in process block 604, if there are no items in the selected set, then in process block 606, a next set is selected and processing returns to process block 604. In one embodiment, two sets of items are used.

Otherwise, in process block 608, an item, such as the first one if an ordered set is used or another item, is selected from the set. In process block 610, the information corresponding to the item is retrieved. In process block 612, an entity, typically the first entity, is processed. In one embodiment, a packet is sent. Next, in process block 614, the deficit of the item is decreased by some constant or variable value, such as the size of the sent packet or other value commiserate with the processing performed. Next, as determined in process block 616, if there are no more entities in the item, then in process block 618, the item is removed from the set as it has no more processing to be performed, and processing returns to process block 604. Otherwise, as determined in process block 620, if the deficit does not allow the item to be further processed (e.g., the deficit is less than a predetermined constant value such as zero or determined via another comparison), then, in process block 622, the item is removed from the current set and placed in another of the sets of items typically based on the value of the deficit for the item, its quantum, and the current set, such that the item will not be manipulated further until it actually would have developed enough quantum to process one of its entities. Additionally, the deficit for the item is increased by an appropriate additional quantum corresponding to the next time the item is serviced or processed. Processing then returns to process block 604. Otherwise, processing returns to process block 608 to select and process a next item in the set (or the same item if it is the only one in the set.)

Figure 7:
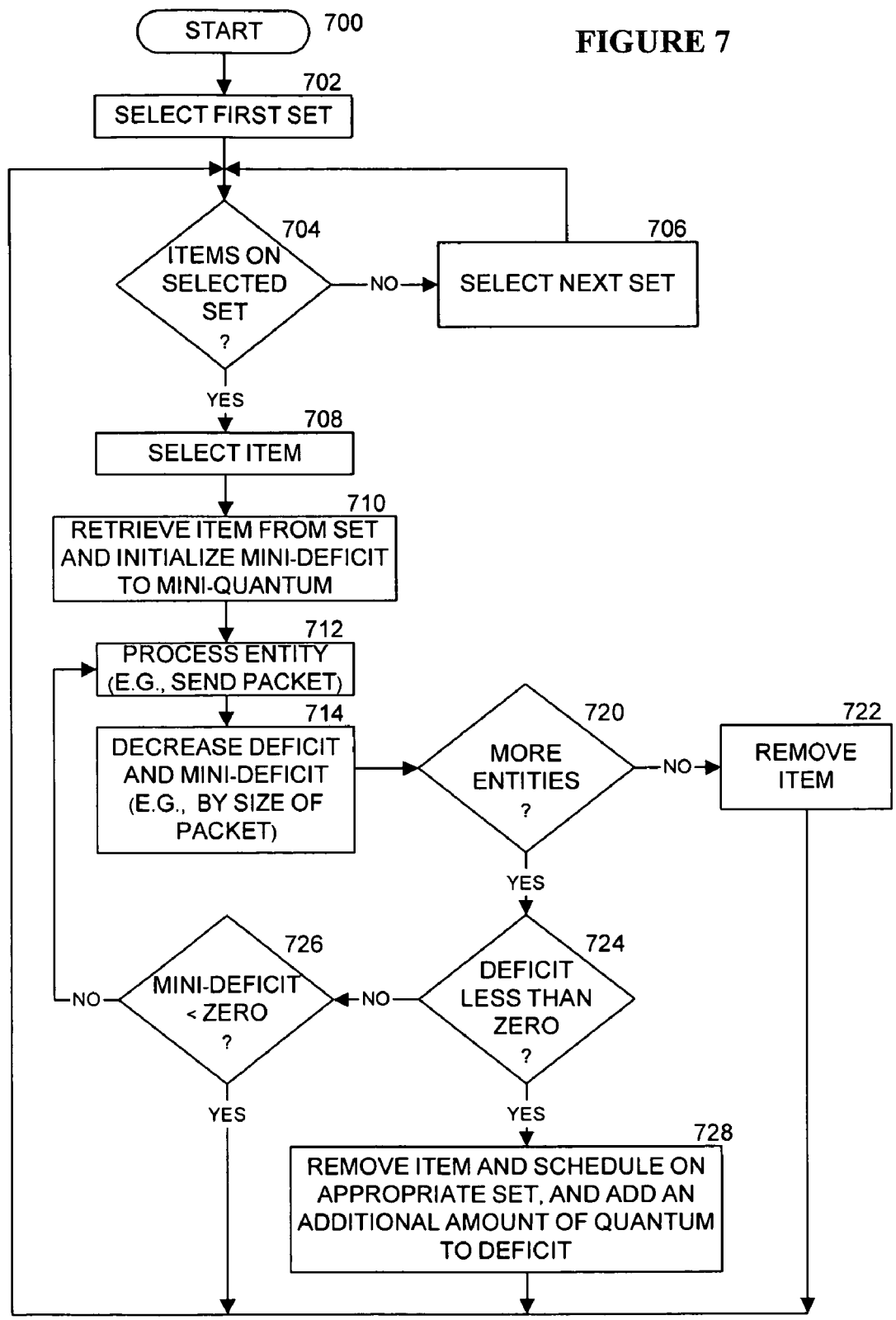
FIG. 7 is a flow diagram of a process used in one embodiment for scheduling the processing of entities and items within one or more sets of items.

FIG. 7 illustrates a scheduling process used in one embodiment. Processing begins with process block 700, and proceeds to process block 702, wherein a first set is selected. Next, as determined in process block 704, if there are no items in the selected set, then in process block 706, a next set is selected and processing returns to process block 704.

Otherwise, in process block 708, an item, such as the first one if an ordered set is used or another item, is selected from the set. In process block 710, the information corresponding to the item is retrieved and a mini-deficit value is initialized to a mini-quantum value. In one embodiment, the same mini-quantum is used for all items, while in one embodiment, the mini-quantum is not the same for all items. Note, that if a mini-quantum value is set to less than a minimized sized packet, then the process illustrated in FIG. 6 is achieved (with some extraneous steps) in one embodiment.

Next, in process block 712, an entity, typically the first entity, is processed. In one embodiment, a packet is sent. Next, in process block 714, the deficit and mini-deficit of the item are each decreased by some constant or variable value, such as the size of the sent packet or other value commiserate with the processing performed. Next, as determined in process block 720, if there are no more entities in the item, then in process block 722, the item is removed from the set as it has no more processing to be performed, and processing returns to process block 704.

Otherwise, as determined in process block 724, if the deficit does not allow the item to be further processed (e.g., the deficit is less than a predetermined constant value such as zero or determined via another comparison), then, in process block 728, the item is removed from the current set and placed in another of the sets of items typically based on the value of the deficit for the item, its quantum, and the current set, such that the item will not be manipulated further until it actually would have developed enough quantum to process one of its entities. Additionally, the deficit for the item is increased by an appropriate additional quantum corresponding to the next time the item is serviced or processed. Processing then returns to process block 704.

Otherwise, if, as determined in process block 726, the mini-deficit does not allow the item to be further processed (e.g., the mini-deficit is less than a predetermined constant value such as zero or determined via another comparison) processing returns to process block 704. Otherwise, processing returns to process block 716 to process another entity as the allocated deficit and the mini-deficit were not previously completely used.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for scheduling the processing of a plurality of items in a set of items, each of the plurality of items having an associated deficit and mini-deficit, the method comprising:
    (a) selecting a next particular item from the set of items currently having enough deficit to process the particular item; (708) and
    (b) processing one or more entities associated with the particular item a commensurate amount corresponding to the mini-deficit associated with the particular item, (712, 714, 726);
    (c) repeatedly performing operations (a) and (b) wherein said processing the one or more entities is ceased if there are no more entities associated with the particular item (720) or if said deficit associated with the particular item does not allow any further processing at the current time (724).

2. The method of claim 1, wherein said processing one or more entities associated with the particular item a commensurate amount corresponding to the mini-deficit associated with the particular item includes adjusting the deficit associated with the particular item by a first value corresponding to the processing of the entity (714).

3. The method of claim 2, wherein said processing one or more entities associated with the particular item a commensurate amount corresponding to the mini-deficit associated with the particular item includes adjusting the mini-deficit associated with the particular item by a second value corresponding to the processing of the entity (714).

4. The method of claim 3, wherein the first value and the second value are equal.

5. The method of claim 3, wherein processing one or more entities comprises:
    initializing the mini-deficit associated with the particular item;
    decreasing the mini-deficit of the particular item by a second value associated with the processing;
    determining if the mini-deficit allows the particular item to be further processed; and
    processing a different item in the set of items after said determining if the mini-deficit allows the particular item to be further processed.

6. The method of claim 1, wherein said processing one or more entities associated with the particular item a commensurate amount corresponding to the mini-deficit associated with the particular item includes adjusting the mini-deficit associated with the particular item by a second value corresponding to the processing of the entity (714).

7. The method of claim 1, wherein processing one or more entities comprises:
    initializing the mini-deficit associated with the particular item;
    decreasing the mini-deficit of the particular item by a second value associated with the processing;
    determining if the mini-deficit allows the particular item to be further processed; and
    processing a different item in the set of items after said determining if the mini-deficit allows the particular item to be further processed.

8. The method of claim 1, wherein said items comprise queues, and said entities comprise packets.

9. The method of claim 1, comprising selecting and processing a different item from the set of items.

10. The method of claim 9, comprising selecting and processing a different set of items.

11. The method of claim 10, wherein selecting and processing a different item or a different set of items is performed in response to determining the current item or set of items to be empty.

12. One or more computer-readable media containing computer-executable instructions for performing operations for scheduling items, said operations comprising:
    (a) selecting a next particular item from the set of items currently having enough deficit to process the particular item; (708) and
    (b) processing one or more entities associated with the particular item a commensurate amount corresponding to the mini-deficit associated with the particular item, (712, 714, 726);
    (c) repeatedly performing operations (a) and (b) wherein said processing the one or more entities is ceased if there are no more entities associated with the particular item (720) or if said deficit associated with the particular item does not allow any further processing at the current time (724).

13. The computer-readable media of claim 12, wherein said processing one or more entities associated with the particular item a commensurate amount corresponding to the mini-deficit associated with the particular item includes adjusting the deficit associated with the particular item by a first value corresponding to the processing of the entity (714).

14. The computer-readable media of claim 13, wherein said processing one or more entities associated with the particular item a commensurate amount corresponding to the mini-deficit associated with the particular item includes adjusting the mini-deficit associated with the particular item by a second value corresponding to the processing of the entity (714).

15. The computer-readable media of claim 12, wherein processing one or more entities comprises:
   initializing the mini-deficit associated with the particular item;
   decreasing the mini-deficit of the particular item by a second value associated with the processing;
   determining if the mini-deficit allows the particular item to be further processed; and
   processing a different item in the set of items after said determining if the mini-deficit allows the particular item to be further processed.

16. The computer-readable media of claim 12, wherein said items comprise queues, and said entities comprise packets.

17. The computer-readable media of claim 12, comprising selecting and processing a different item from the set of items.

18. The computer-readable media of claim 17, comprising selecting and processing a different set of items.

19. The computer-readable media of claim 18, wherein selecting and processing a different item or a different set of items is performed in response to determining the current item or set of items to be empty.

20. An apparatus for scheduling items, the apparatus comprising means for processing each of the items in the current set, said means for processing each of the items including:
   means for identifying a particular item;
   means for adding a quantum to a deficit of the particular item;
   means for initializing a mini-deficit associated with the particular item;
   means for processing an entity corresponding to the particular item;
   means for decreasing the deficit of the particular item by a value;
   means for decreasing the mini-deficit of the particular item by a second value;
   means for determining if the mini-deficit and the deficit allows the particular item to be further processed; and
   means for continuing processing of the particular item in response to said determining if the mini-deficit and the deficit allows the particular item to be further processed determining that it does, else setting the particular item to be a different item.

21. The apparatus of claim 20, wherein said processing items further comprises setting the particular item to be a different item in the current set.

22. An apparatus comprising:
   a plurality of queues for buffering a plurality of packets; and
   a scheduler to perform scheduling of the sending of packets from the plurality of packets, the scheduler including: control logic; and one or more memory devices configured to maintain indications of queues of the plurality of queues with packets to be sent;
   wherein said scheduling includes processing queues corresponding to the indications of queues, with said processing including:
      identifying a particular indication of a particular queue of the plurality of queues;
      adding a quantum to a deficit of the particular indication;
      sending a packet from the particular queue corresponding to the particular indication;
      decreasing the deficit by a value;
      determining if the deficit allows the particular queue to be further processed;
      initializing a mini-deficit associated with the particular indication;
      decreasing the mini-deficit by a second value;
      determining if the mini-deficit allows the particular queue to be further processed; and
      setting the particular indication to be a different indication in the current set after said determining if the mini-deficit allows the particular queue to be further processed.

23. The apparatus of claim 22, wherein the first and second values are each commiserate with a size of the packet.

24. The apparatus of claim 22, wherein a group including said sending the packet, said decreasing the deficit, said decreasing the mini-deficit, said determining if the mini-deficit allows, and said determining if the deficit allows is repeatedly performed based on the particular indication while: said determining if the deficit allows determines that the deficit allows the particular queue to be further processed, said determining if the mini-deficit allows the particular queue to be further processed, and the particular queue is not empty.

* * * * *